(12) United States Patent
Fox et al.

(10) Patent No.: US 8,417,652 B2
(45) Date of Patent: Apr. 9, 2013

(54) SYSTEM AND METHOD FOR EFFECTING OPTIMIZATION OF A SEQUENTIAL ARRANGEMENT OF ITEMS

(75) Inventors: Barry R. Fox, Ballwin, MO (US); Steven Jowers, Friendswood, TX (US)

(73) Assignee: The Boeing Company, Chicago, IL (US)

(*) Notice: Subject to any disclaimer, the term of this patent is extended or adjusted under 35 U.S.C. 154(b) by 958 days.

(21) Appl. No.: 12/491,448

(22) Filed: Jun. 25, 2009

(65) Prior Publication Data

US 2010/0332429 A1 Dec. 30, 2010

(51) Int. Cl.
*G06F 15/18* (2006.01)
*G06N 3/00* (2006.01)
*G06N 3/12* (2006.01)

(52) U.S. Cl.
USPC .................................................... 706/13

(58) Field of Classification Search .................. None
See application file for complete search history.

(56) References Cited

U.S. PATENT DOCUMENTS

| | | | |
|---|---|---|---|
| 5,319,781 A | 6/1994 | Syswerda | |
| 5,890,134 A | 3/1999 | Fox | |
| 2003/0130827 A1* | 7/2003 | Bentzien et al. | 703/11 |
| 2007/0106545 A1 | 5/2007 | Jowers et al. | |
| 2007/0124189 A1 | 5/2007 | Stoughton et al. | |
| 2007/0239362 A1* | 10/2007 | Reaume et al. | 702/19 |
| 2007/0239363 A1* | 10/2007 | Reaume et al. | 702/19 |
| 2008/0158262 A1* | 7/2008 | Russell et al. | 345/690 |

* cited by examiner

*Primary Examiner* — Jeffrey A Gaffin
*Assistant Examiner* — Li-Wu Chang
(74) *Attorney, Agent, or Firm* — Armstrong Teasdale LLP

(57) ABSTRACT

A tracking unit includes a register for storing initial sequences and an accumulator for effecting a statistical treatment of the initial sequences, and ensures the statistical treatment relates to no more than a number of best sequences based on an evaluating algorithm. A generating unit employs the statistical treatment to present a new sequence. A measuring unit evaluates the new sequence according to the algorithm and cooperates with the tracking unit to effect providing the new sequence to the tracking unit when the evaluating indicates the new sequence is appropriate for the storing and statistical treatment. The measuring unit provides the new sequence to a regulating unit with an indication of efficacy of the new sequence. The regulating unit employs the indication to store a best-sequence-yet-received and responds to a criterion to order the generating unit to present a new sequence or to present the best-sequence-yet-received at an output locus.

14 Claims, 14 Drawing Sheets

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   | 1 |
| 1 | 1 |   | 1 | 1 | 1 | 1 | 1 | 1 | 1 | 1 |
| 2 | 1 |   |   |   |   |   |   |   | 1 | 1 |
| 3 | 1 |   | 1 |   | 1 | 1 | 1 | 1 | 1 | 1 |
| 4 | 1 |   | 1 |   |   |   |   |   | 1 | 1 |
| 5 | 1 |   | 1 |   | 1 |   | 1 | 1 | 1 | 1 |
| 6 | 1 |   | 1 |   | 1 |   |   |   | 1 | 1 |
| 7 | 1 |   | 1 |   | 1 |   | 1 |   | 1 | 1 |
| 8 | 1 |   |   |   |   |   |   |   |   | 1 |
| 9 |   |   |   |   |   |   |   |   |   |   |

Sequence #1: 3, 5, 7, 6, 4, 2, 8, 0 , 9

FIG. 2

|   | 0 | 1 | 2 | 3 | 4 | 5 | 6 | 7 | 8 | 9 |
|---|---|---|---|---|---|---|---|---|---|---|
| 0 |   | 1 | 1 | 1 | 1 | 1 | 1 | 1 | 1 | 1 |
| 1 |   |   | 1 | 1 | 1 | 1 | 1 | 1 | 1 | 1 |
| 2 |   |   |   |   |   |   |   |   |   |   |
| 3 |   |   | 1 |   | 1 | 1 | 1 |   |   |   |
| 4 |   |   | 1 |   |   | 1 | 1 |   |   |   |
| 5 |   |   | 1 |   |   |   | 1 |   |   |   |
| 6 |   |   | 1 |   |   |   |   |   |   |   |
| 7 |   |   | 1 | 1 | 1 | 1 | 1 |   | 1 | 1 |
| 8 |   |   | 1 | 1 | 1 | 1 | 1 |   |   |   |
| 9 |   |   | 1 | 1 | 1 | 1 | 1 |   | 1 |   |

60

Sequence #2: 0, 1, 7, 9, 8, 3, 4, 5, 6, 2

FIG. 3

|   | 0 | 1 | 2 | 3 | 4 | 5 | 6 | 7 | 8 | 9 |
|---|---|---|---|---|---|---|---|---|---|---|
| 0 |   |   |   |   |   |   |   |   |   |   |
| 1 | 1 |   |   | 1 | 1 | 1 | 1 | 1 | 1 | 1 |
| 2 | 1 | 1 |   | 1 | 1 | 1 | 1 | 1 | 1 | 1 |
| 3 | 1 |   |   |   |   |   |   |   |   |   |
| 4 | 1 |   |   | 1 |   |   |   |   | 1 | 1 |
| 5 | 1 |   |   | 1 | 1 |   |   |   |   |   |
| 6 | 1 |   |   | 1 | 1 | 1 |   |   |   |   |
| 7 | 1 |   |   | 1 | 1 | 1 | 1 |   | 1 | 1 |
| 8 | 1 |   |   | 1 | 1 | 1 | 1 |   |   | 1 |
| 9 | 1 |   |   | 1 | 1 | 1 | 1 |   |   |   |

62

Sequence #3: 2, 1, 7, 8, 9, 6, 5, 4, 3, 0

FIG. 4

|   | 0 | 1 | 2 | 3 | 4 | 5 | 6 | 7 | 8 | 9 |
|---|---|---|---|---|---|---|---|---|---|---|
| 0 |   | 1 |   | 1 |   |   |   | 1 |   |   |
| 1 |   |   |   | 1 |   |   |   | 1 |   |   |
| 2 | 1 | 1 |   | 1 |   |   | 1 | 1 |   | 1 |
| 3 |   |   |   |   |   |   |   |   |   |   |
| 4 | 1 | 1 | 1 | 1 | 1 | 1 | 1 | 1 |   | 1 |
| 5 | 1 | 1 | 1 | 1 |   |   | 1 | 1 |   | 1 |
| 6 | 1 | 1 |   | 1 |   |   |   | 1 |   | 1 |
| 7 |   |   |   | 1 |   |   |   |   |   |   |
| 8 | 1 | 1 | 1 | 1 | 1 | 1 | 1 | 1 |   | 1 |
| 9 | 1 | 1 |   | 1 |   |   |   |   |   |   |

64

Sequence #4: 8, 4, 5, 2, 6, 9, 0, 1, 7, 3

FIG. 5

| | 0 | 1 | 2 | 3 | 4 | 5 | 6 | 7 | 8 | 9 |
|---|---|---|---|---|---|---|---|---|---|---|
| 0 | 0 | 1 | 1 | 1 | 1 | 1 | 1 | 1 | 1 | 2 |
| 1 | 1 | 0 | 2 | 2 | 2 | 2 | 2 | 2 | 2 | 2 |
| 2 | 1 | 0 | 0 | 0 | 0 | 0 | 0 | 0 | 1 | 1 |
| 3 | 1 | 0 | 2 | 0 | 2 | 2 | 2 | 1 | 1 | 1 |
| 4 | 1 | 0 | 2 | 0 | 0 | 1 | 1 | 0 | 1 | 1 |
| 5 | 1 | 0 | 2 | 0 | 1 | 0 | 2 | 1 | 1 | 1 |
| 6 | 1 | 0 | 2 | 0 | 1 | 0 | 0 | 0 | 1 | 1 |
| 7 | 1 | 0 | 2 | 1 | 2 | 1 | 2 | 0 | 2 | 2 |
| 8 | 1 | 0 | 1 | 1 | 1 | 1 | 1 | 0 | 0 | 1 |
| 9 | 0 | 0 | 1 | 1 | 1 | 1 | 1 | 0 | 1 | 0 |

Sequence #1: 1, 3, 5, 7, 6, 4, 2, 8, 0, 9

Sequence #2: 0, 1, 7, 9, 8, 3, 4, 5, 6, 2

|   | 0 | 1 | 2 | 3 | 4 | 5 | 6 | 7 | 8 | 9 |
|---|---|---|---|---|---|---|---|---|---|---|
| 0 | 0 | 1 | 1 | 1 | 1 | 1 | 1 | 1 | 1 | 2 |
| 1 | 2 | 0 | 2 | 3 | 3 | 3 | 3 | 3 | 3 | 3 |
| 2 | 2 | 1 | 0 | 1 | 1 | 1 | 1 | 1 | 2 | 2 |
| 3 | 2 | 0 | 2 | 0 | 2 | 2 | 2 | 1 | 1 | 1 |
| 4 | 2 | 0 | 2 | 1 | 0 | 1 | 1 | 0 | 1 | 1 |
| 5 | 2 | 0 | 2 | 1 | 2 | 0 | 2 | 1 | 1 | 1 |
| 6 | 2 | 0 | 2 | 1 | 2 | 1 | 0 | 0 | 1 | 1 |
| 7 | 2 | 0 | 2 | 2 | 3 | 2 | 3 | 0 | 3 | 3 |
| 8 | 2 | 0 | 1 | 2 | 2 | 2 | 2 | 0 | 0 | 2 |
| 9 | 1 | 0 | 1 | 2 | 2 | 2 | 2 | 0 | 1 | 0 |

Sequence #1: 1, 3, 5, 7, 6, 4, 2, 8, 0, 9     68

Sequence #2: 0, 1, 7, 9, 8, 3, 4, 5, 6, 2

Sequence #3: 2, 1, 7, 8, 9, 6, 5, 4, 3, 0

FIG. 7

|   | 0 | 1 | 2 | 3 | 4 | 5 | 6 | 7 | 8 | 9 |
|---|---|---|---|---|---|---|---|---|---|---|
| 0 | 0 | 2 | 1 | 2 | 1 | 1 | 1 | 2 | 1 | 2 |
| 1 | 2 | 0 | 2 | 4 | 3 | 3 | 3 | 4 | 3 | 3 |
| 2 | 3 | 2 | 0 | 2 | 1 | 1 | 2 | 2 | 2 | 3 |
| 3 | 2 | 0 | 2 | 0 | 2 | 2 | 2 | 1 | 1 | 1 |
| 4 | 3 | 1 | 3 | 2 | 0 | 2 | 2 | 1 | 1 | 2 |
| 5 | 3 | 1 | 3 | 2 | 2 | 0 | 3 | 2 | 1 | 2 |
| 6 | 3 | 1 | 2 | 2 | 2 | 1 | 0 | 1 | 1 | 2 |
| 7 | 2 | 0 | 2 | 3 | 3 | 2 | 3 | 0 | 3 | 3 |
| 8 | 3 | 1 | 2 | 3 | 3 | 3 | 3 | 1 | 0 | 3 |
| 9 | 2 | 1 | 1 | 3 | 2 | 2 | 2 | 1 | 1 | 0 |

Sequence #1: 1, 3, 5, 7, 6, 4, 2, 8, 0 , 9

Sequence #2: 0, 1, 7, 9, 8, 3, 4, 5, 6, 2

Sequence #3: 2, 1, 7, 8, 9, 6, 5, 4, 3, 0

Sequence #4: 8, 4, 5, 2, 6, 9, 0, 1, 7, 3

|   | 0 | 1 | 2 | 3 | 4 | 5 | 6 | 7 | 8 | 9 |
|---|---|---|---|---|---|---|---|---|---|---|
| 0 | 0 | 1 | 0 | 1 | 0 | 0 | 0 | 1 | 0 | 1 |
| 1 | 2 | 0 | 1 | 3 | 2 | 2 | 2 | 3 | 2 | 2 |
| 2 | 3 | 2 | 0 | 2 | 1 | 1 | 2 | 2 | 2 | 3 |
| 3 | 2 | 0 | 1 | 0 | 1 | 1 | 1 | 1 | 1 | 1 |
| 4 | 3 | 1 | 2 | 2 | 0 | 1 | 1 | 1 | 1 | 2 |
| 5 | 3 | 1 | 2 | 2 | 2 | 0 | 2 | 2 | 1 | 2 |
| 6 | 3 | 1 | 1 | 2 | 2 | 1 | 0 | 1 | 1 | 2 |
| 7 | 2 | 0 | 1 | 2 | 2 | 1 | 2 | 0 | 2 | 2 |
| 8 | 3 | 1 | 1 | 2 | 2 | 2 | 2 | 1 | 0 | 3 |
| 9 | 2 | 1 | 0 | 2 | 1 | 1 | 1 | 1 | 0 | 0 |

Sequence #1: 1, 3, 5, 7, 6, 4, 2, 8, 0 , 9        72

Sequence #3: 2, 1, 7, 8, 9, 6, 5, 4, 3, 0

Sequence #4: 8, 4, 5, 2, 6, 9, 0, 1, 7, 3

FIG. 9

|  | 0 | 1 | 2 | 3 | 4 | 5 | 6 | 7 | 8 | 9 | |
|---|---|---|---|---|---|---|---|---|---|---|---|
| 0 | 0 | 1 | 0 | 1 | 0 | 0 | 0 | 1 | 0 | 1 | 4 |
| 1 | 2 | 0 | 1 | 3 | 2 | 2 | 2 | 3 | 2 | 2 | 19 |
| 2 | 3 | 2 | 0 | 2 | 1 | 1 | 2 | 2 | 2 | 3 | 18 |
| 3 | 2 | 0 | 1 | 0 | 1 | 1 | 1 | 1 | 1 | 1 | 9 |
| 4 | 3 | 1 | 2 | 2 | 0 | 1 | 1 | 1 | 1 | 2 | 14 |
| 5 | 3 | 1 | 2 | 2 | 2 | 0 | 2 | 2 | 1 | 2 | 17 |
| 6 | 3 | 1 | 1 | 2 | 2 | 1 | 0 | 1 | 1 | 2 | 14 |
| 7 | 2 | 0 | 1 | 2 | 2 | 1 | 2 | 0 | 2 | 2 | 14 |
| 8 | 3 | 1 | 1 | 2 | 2 | 2 | 2 | 1 | 0 | 3 | 17 |
| 9 | 2 | 1 | 0 | 2 | 1 | 1 | 1 | 1 | 0 | 0 | 9 |
|  | 23 | 8 | 9 | 18 | 13 | 10 | 13 | 13 | 10 | 18 |  |

COLUMN SUMS　　　　　　　　　　　　　　　　　　ROW SUMS

|  | 0 | 1 | 2 | 3 | 4 | 5 | 6 | 7 | 8 | 9 | |
|---|---|---|---|---|---|---|---|---|---|---|---|
| 0 | 0.5 | 0.3 | 0.3 | 0.4 | 0.4 | 0.3 | 0.4 | 0.4 | 0.3 | 0.4 | 23 |
| 1 | 0.7 | 0.5 | 0.5 | 0.7 | 0.6 | 0.6 | 0.6 | 0.6 | 0.6 | 0.7 | 8 |
| 2 | 0.7 | 0.5 | 0.5 | 0.7 | 0.6 | 0.5 | 0.6 | 0.6 | 0.5 | 0.7 | 9 |
| 3 | 0.6 | 0.3 | 0.3 | 0.5 | 0.4 | 0.4 | 0.4 | 0.4 | 0.4 | 0.5 | 18 |
| 4 | 0.6 | 0.4 | 0.4 | 0.6 | 0.5 | 0.4 | 0.5 | 0.5 | 0.4 | 0.6 | 13 |
| 5 | 0.7 | 0.4 | 0.5 | 0.6 | 0.6 | 0.5 | 0.6 | 0.6 | 0.5 | 0.6 | 10 |
| 6 | 0.6 | 0.4 | 0.4 | 0.6 | 0.5 | 0.4 | 0.5 | 0.5 | 0.4 | 0.6 | 13 |
| 7 | 0.6 | 0.4 | 0.4 | 0.6 | 0.5 | 0.4 | 0.5 | 0.5 | 0.4 | 0.6 | 13 |
| 8 | 0.7 | 0.4 | 0.5 | 0.6 | 0.6 | 0.5 | 0.6 | 0.6 | 0.5 | 0.6 | 10 |
| 9 | 0.6 | 0.3 | 0.3 | 0.5 | 0.4 | 0.4 | 0.4 | 0.4 | 0.4 | 0.5 | 18 |
|  | 23 | 8 | 9 | 18 | 13 | 10 | 13 | 13 | 10 | 18 |  |

COLUMN SUMS ↗  COPY OF COLUMN SUMS ↖

|   | 0 | 1 | 2 | 3 | 4 | 5 | 6 | 7 | 8 | 9 |   |
|---|---|---|---|---|---|---|---|---|---|---|---|
| 0 | 0.5 | 0.2 | 0.2 | 0.3 | 0.2 | 0.2 | 0.2 | 0.2 | 0.2 | 0.3 | 4 |
| 1 | 0.8 | 0.5 | 0.5 | 0.7 | 0.6 | 0.5 | 0.6 | 0.6 | 0.5 | 0.7 | 19 |
| 2 | 0.8 | 0.5 | 0.5 | 0.7 | 0.6 | 0.5 | 0.6 | 0.6 | 0.5 | 0.7 | 18 |
| 3 | 0.7 | 0.3 | 0.3 | 0.5 | 0.4 | 0.3 | 0.4 | 0.4 | 0.3 | 0.5 | 9 |
| 4 | 0.8 | 0.7 | 0.7 | 0.6 | 0.5 | 0.5 | 0.5 | 0.5 | 0.5 | 0.6 | 14 |
| 5 | 0.8 | 0.5 | 0.5 | 0.7 | 0.5 | 0.5 | 0.5 | 0.5 | 0.5 | 0.7 | 17 |
| 6 | 0.8 | 0.4 | 0.4 | 0.6 | 0.5 | 0.5 | 0.5 | 0.5 | 0.5 | 0.6 | 14 |
| 7 | 0.8 | 0.4 | 0.4 | 0.6 | 0.5 | 0.5 | 0.5 | 0.5 | 0.5 | 0.6 | 14 |
| 8 | 0.8 | 0.5 | 0.5 | 0.7 | 0.5 | 0.5 | 0.5 | 0.5 | 0.5 | 0.7 | 17 |
| 9 | 0.7 | 0.3 | 0.3 | 0.5 | 0.4 | 0.3 | 0.4 | 0.4 | 0.3 | 0.5 | 9 |
|   | 4 | 19 | 18 | 9 | 14 | 17 | 14 | 14 | 17 | 9 |   |

COPY OF ROW SUMS ↙    ROW SUMS ↗

|   | 0 | 1 | 2 | 3 | 4 | 5 | 6 | 7 | 8 | 9 |
|---|---|---|---|---|---|---|---|---|---|---|
| 0 | 0 | 0.3 | 0 | 0.3 | 0 | 0 | 0 | 0.3 | 0 | 0.3 |
| 1 | 0.7 | 0 | 0.3 | 1 | 0.7 | 0.7 | 0.7 | 1 | 0.7 | 0.7 |
| 2 | 1 | 0.7 | 0 | 0.7 | 0.3 | 0.3 | 0.7 | 0.7 | 0.7 | 1 |
| 3 | 0.7 | 0 | 0.3 | 0 | 0.3 | 0.3 | 0.3 | 0.3 | 0.3 | 0.3 |
| 4 | 1 | 0.3 | 0.7 | 0.7 | 0 | 0.3 | 0.3 | 0.3 | 0.3 | 0.7 |
| 5 | 1 | 0.3 | 0.7 | 0.7 | 0.7 | 0 | 0.7 | 0.7 | 0.3 | 0.7 |
| 6 | 1 | 0.3 | 0.3 | 0.7 | 0.7 | 0.3 | 0 | 0.3 | 0.3 | 0.7 |
| 7 | 0.3 | 0 | 0.3 | 0.7 | 0.7 | 0.3 | 0.7 | 0 | 0.7 | 0.7 |
| 8 | 1 | 0.3 | 0.3 | 0.7 | 0.7 | 0.7 | 0.7 | 0.3 | 0 | 1 |
| 9 | 0.7 | 0.3 | 0 | 0.7 | 0.3 | 0.3 | 0.3 | 0.3 | 0 | 0 |

SYSTEM AND METHOD FOR EFFECTING OPTIMIZATION OF A SEQUENTIAL ARRANGEMENT OF ITEMS

TECHNICAL FIELD

The present disclosure may be directed to systems and methods for solving sequencing problems.

BACKGROUND

Sequencing problems may be common across multiple industries. By way of example and not by way of limitation, a stock cutting problem may be common in the composite aircraft industry. A stock cutting problem may be posed as how one may arrange individual pattern shapes on a material bed for cutting in a manner minimizing the amount of wasted material. By way of further example and not by way of limitation, a resource constrained project scheduling problem may be common in aircraft manufacturing and overhaul operations. A resource constrained project scheduling problem may be posed as how one may order operations to be performed in a manner to maximize utilization of resources and minimize overall duration.

Sequencing problems are generally categorized, within the theory of computation, as NP-Complete, meaning that sequencing problems are members of a large family of especially difficult problems where the time required to find a solution grows exponentially with the size of the problem. Without use of specialized methods, the time required to find good solutions to sequencing problems is proportional to N! The symbol N! may be known as "n-factorial". $N!=n*(n-1)*(n-2) \ldots *2*1$ where N may be the number of items to be sequenced.

By way of example and not by way of limitation, potential uses of this method may include

- use to find optimized solutions to conventional sequencing problems in design, manufacturing, maintenance, and transportation, where the objective is to optimize the sequence of operations, actions, events, or other occurrences ordered in time, including traveling salesman problem, line balancing problems, scheduling manufacturing and maintenance, data transmissions in a communications network, and similar problems.
- use to find optimized solutions to conventional sequencing problems in design, manufacturing, maintenance, and transportation, where the objective is to optimize the placement of objects, components, or other physical objects ordered in space, including the stock cutting problem, pattern layout problem, circuit board design, communications network design, and similar problems.
- use to optimize the results of a decision process by optimizing the sequence of discrete decisions, including use of this method to optimize the sequence of decisions within classical "branch-and-bound" decision trees, commonly used within Operations Research.
- use to optimize the results of a physical process by optimizing the sequence of discrete actions, including synthesis of novel organic compounds that arise through sequences of heating, cooling, hydration, dehydration, exposure to ultraviolet light, exposure to electrical discharge, and other physical conditions.
- use to find optimized solutions to any problem within the family of NP-Complete problems, by rendering said problems as sequencing problems, using this method to find an optimized solution, including NP-complete problems described in Computer Science literature.
- use to optimize the sequence of atoms within a molecular structure, including the sequence of atoms within DNA or RNA, the sequence of atoms within proteins, the sequence of atoms within polymers, or the sequence of layers within a crystal lattice.

While algorithms may have been developed for some particular sequencing problems, general purpose methods for solution of sequencing problems remain elusive. Genetic Algorithms have proven useful in many computational problems. While Genetic Algorithms may be useful for general sequencing problems, they may have limited value for large problems, problems that have large-scale structure, and other circumstances.

There is a need for a system and method for optimizing a sequential arrangement of items that may be substantially generally applied to a wide variety and range of sequencing problems.

SUMMARY

In one aspect, a system is provided for effecting optimization of a sequential arrangement of items with respect to a predetermined evaluating algorithm. The system includes a computer processor, and a computer-readable storage device having encoded thereon computer-readable instructions that are executable by the computer processor to perform functions that provide an initiating unit, a tracking unit coupled with the initiating unit, a generating unit coupled with the tracking unit, a measuring unit coupled with the generating unit and with the tracking unit, a regulating unit coupled with the measuring unit and the generating unit, and an output locus coupled with the regulating unit. The initiating unit provides a predetermined number of initial sequences to the tracking unit. The tracking unit includes a register for storing the initial sequences and an accumulator for effecting a statistical treatment of the initial sequences. The register and the accumulator are each coupled to an adjusting unit. The register, the accumulator, and the adjusting unit cooperate to ensure the statistical treatment relates to no more than a predetermined number of best sequences based on the predetermined evaluating algorithm. The generating unit employs the statistical treatment to present a new sequence. The measuring unit evaluates the new sequence according to the predetermined evaluating algorithm. The measuring unit cooperates with the tracking unit to effect providing the new sequence to the tracking unit when the evaluating indicates the new sequence is appropriate for the storing and statistical treatment. The measuring unit provides the new sequence to the regulating unit with an indication of efficacy of the new sequence. The regulating unit employs the indication to store at least a best-sequence-yet-received. The regulating unit responds to at least one predetermined criterion to order the generating unit to present a new sequence or to present the best-sequence-yet-received at the output locus.

In another aspect, a method is provided for effecting optimization of a sequential arrangement of items with respect to a predetermined evaluating algorithm. The method includes providing an initiating unit, providing a tracking unit configured for coupling with the initiating unit, providing a generating unit configured for coupling with the tracking unit, providing a measuring unit configured for coupling with the generating unit and with the tracking unit, providing a regulating unit configured for coupling with the measuring unit and the generating unit, and providing an output locus configured for coupling with the regulating unit. The initiating unit is operated to provide a predetermined number of initial sequences to the tracking unit. The tracking unit is operated to store and effect a statistical treatment of the initial sequences. The tracking unit includes a register for storing the initial sequences and an accumulator for effecting the statistical treatment. The register and the accumulator are each coupled to an adjusting unit. The register, the accumulator, and the adjusting unit cooperate to ensure the statistical treatment relates to no more than a predetermined number of best sequences based on the predetermined evaluating algorithm. The generating unit is operated to employ the statistical treatment to present a new sequence. The measuring unit is operated to evaluate the new sequence according to the predetermined evaluating algorithm. The measuring unit is operated to cooperate with the tracking unit to effect providing the new sequence to the tracking unit when the evaluating indicates the new sequence is appropriate for the storing and statistical treatment. The measuring unit is operated to provide the new sequence to the regulating unit with an indication of efficacy of the new sequence. The regulating unit is operated to employ the indication to store at least a best sequence-yet-received. The regulating unit is operated to respond to at least one predetermined criterion to order the generating unit to present a new sequence or to present the best-sequence-yet-received at the output locus.

In yet another aspect, a system is provided for effecting optimization of a sequential arrangement of items with respect to a predetermined evaluating algorithm. The system includes a computer processor, and a computer-readable storage device having encoded thereon computer-readable instructions that are executable by the computer processor to perform functions that provide an initiating unit, a tracking unit coupled with the initiating unit, a generating unit coupled with the tracking unit, a measuring unit coupled with the generating unit and with the tracking unit, a regulating unit coupled with the measuring unit and the generating unit, and an output locus coupled with the regulating unit. The initiating unit provides a predetermined number of initial sequences to the tracking unit. The tracking unit stores and effects a statistical treatment of the initial sequences. The generating unit employs the statistical treatment to present a new sequence. The measuring unit evaluates the new sequence according to the predetermined evaluating algorithm. The measuring unit cooperates with the tracking unit to effect providing the new sequence to the tracking unit when the evaluating indicates the new sequence is appropriate for the storing and statistical treatment. The measuring unit provides the new sequence to the regulating unit with an indication of efficacy of the new sequence. The regulating unit employs the indication to store at least a best-sequence-yet-received. The regulating unit responds to at least one predetermined criterion to order the generating unit to present a new sequence or to present the best-sequence-yet-received at the output locus. The evaluating indicates the new sequence is appropriate for the storing and statistical treatment when the new sequence is different than sequences previously stored in the tracking unit and the new sequence is better than sequences previously stored in the tracking unit according to the predetermined evaluating algorithm.

In yet another aspect, a method is provided for effecting optimization of a sequential arrangement of items with respect to a predetermined evaluating algorithm. The method includes providing an initiating unit, providing a tracking unit configured for coupling with the initiating unit, providing a generating unit configured for coupling with the tracking unit, providing a measuring unit configured for coupling with the generating unit and with the tracking unit, providing a regulating unit configured for coupling with the measuring unit and the generating unit, and providing an output locus configured for coupling with the regulating unit. The initiating unit is operated to provide a predetermined number of initial sequences to the tracking unit. The tracking unit is operated to store and effect a statistical treatment of the initial sequences. The generating unit is operated to employ the statistical treatment to present a new sequence. The measuring unit is operated to evaluate the new sequence according to the predetermined evaluating algorithm. The measuring unit is operated to cooperate with the tracking unit to effect providing the new sequence to the tracking unit when the evaluating indicates the new sequence is appropriate for the storing and statistical treatment when the new sequence is different than sequences previously stored in the tracking unit and the new sequence is better than sequences previously stored in the tracking unit according to the predetermined evaluating algorithm. The measuring unit is operated to provide the new sequence to the regulating unit with an indication of efficacy of the new sequence. The regulating unit is operated to employ the indication to store at least a best sequence-yet-received. The regulating unit is operated to respond to at least one predetermined criterion to order the generating unit to present a new sequence or to present the best-sequence-yet-received at the output locus.

It is, therefore, a feature of the present disclosure to present a system and method for optimizing a sequential arrangement of items that may be substantially generally applied to a wide variety and range of sequencing problems.

Further features of the present disclosure will be apparent from the following specification and claims when considered in connection with the accompanying drawings, in which like elements are labeled using like reference numerals in the various figures, illustrating the preferred embodiments of the disclosure.

BRIEF DESCRIPTION OF THE DRAWINGS

FIG. 2 is a schematic diagram of a representation of a first exemplary sequence stored according to the teachings of the present disclosure.

FIG. 3 is a schematic diagram of a representation of a second exemplary sequence stored according to the teachings of the present disclosure.

FIG. 4 is a schematic diagram of a representation of a third exemplary sequence stored according to the teachings of the present disclosure.

FIG. 5 is a schematic diagram of a representation of a fourth exemplary sequence stored according to the teachings of the present disclosure.

FIG. 6 is a schematic diagram of a representation of data stored in the accumulator of the present disclosure after adding representations illustrated in FIGS. 2 and 3.

FIG. 7 is a schematic diagram of a representation of data stored in the accumulator of the present disclosure after adding representations illustrated in FIGS. 4 and 6.

FIG. 8 is a schematic diagram of a representation of data stored in the accumulator of the present disclosure after adding representations illustrated in FIGS. 5 and 7.

FIG. 9 is a schematic diagram of a representation of data stored in the accumulator of the present disclosure after subtracting the representation illustrated in FIG. 2 from the representation illustrated in FIG. 8.

FIG. 10 is a schematic diagram of a representation of data stored in the accumulator of the present disclosure as illustrated in FIG. 8, with row and column sums presented.

FIG. 11 is a schematic diagram of a representation of column probabilities associated with data presented in FIG. 10.

FIG. 12 is a schematic diagram of a representation of row probabilities associated with data presented in FIG. 10.

FIG. 13 is a schematic diagram of a representation of cell probabilities associated with data presented in FIG. 10.

DETAILED DESCRIPTION

Figure 1:
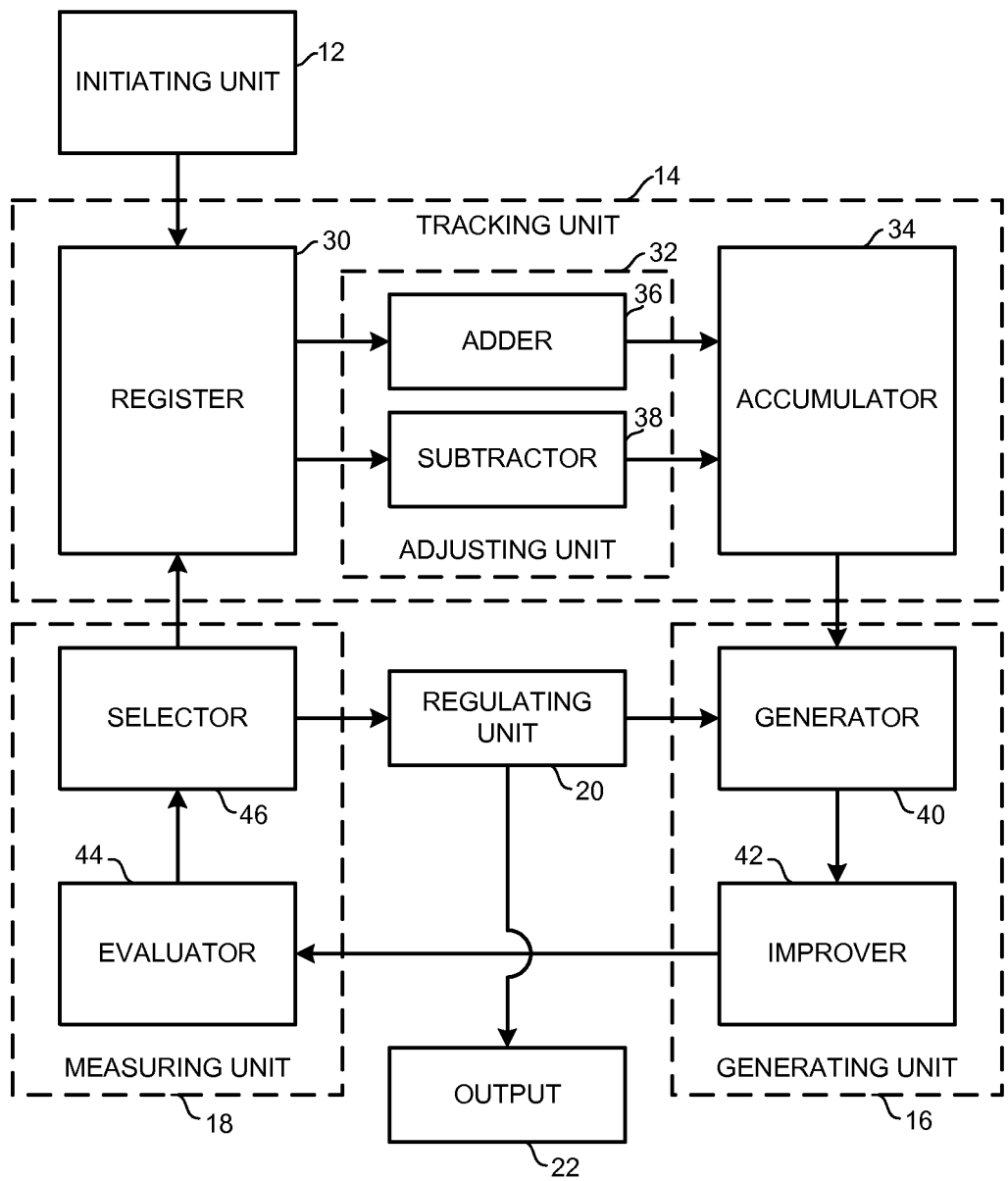
FIG. 1 is a schematic diagram of a system for optimizing a sequential arrangement of items.

FIG. 1 is a schematic diagram of a system for optimizing a sequential arrangement of items. In FIG. 1, a system 10 for optimization of a sequential arrangement of items with respect to a predetermined evaluating algorithm may include an initiating unit 12, a tracking unit 14 coupled with initiating unit 12, a generating unit 16 coupled with tracking unit 14, a measuring unit 18 coupled with generating unit 16 and coupled with tracking unit 14, a regulating unit 20 coupled with measuring unit 18 and generating unit 16 and an output locus 22 coupled with regulating unit 20.

Tracking unit 14 may include a store or register 30 coupled with initiating unit 12, an adjusting unit 32 coupled with register 30 and an accumulator 34 coupled with adjusting unit 32 and generating unit 16. Adjusting unit 32 may include an adder 36 coupled with register 30 and accumulator 34, and may include a subtractor 38 coupled with register 30 and accumulator 34.

Generating unit 16 may include a generator 40 coupled with accumulator 34, and may include an improver 42 coupled with generator 40 and measuring unit 18.

Measuring unit 18 may include an evaluator 44 coupled with improver 42, and may include a selector 46 coupled with evaluator 44, register 30 and regulating unit 20. Regulating unit 20 may be coupled with generator 40.

In operation, initiating unit 12 may begin an optimizing process by providing a predetermined number of initial sequences to tracking unit 14, specifically delivering the initial sequences to register 30. Tracking unit 14 may store the initial sequences in register 30. Register 30 may employ adder 36 to provide the initial sequences to accumulator 34. Tracking unit 14 may effect a statistical treatment of the initial sequences, specifically employing accumulator 34.

Generating unit 16 may employ the statistical treatment provided by accumulator 34 to generate an initial new sequence, specifically employing generator 40. Improver 42 may improve the initial new sequence generated by generator 40 to present a new sequence to measuring unit 18. Improver 42 may be eliminated, if desired, so that an initial new sequence presented by generator 40 is presented to measuring unit 18 as a new sequence.

Measuring unit 18 may evaluate the new sequence according to the predetermined evaluating algorithm (not shown in FIG. 1) specifically employing evaluator 44. Evaluator 44, selector 46 and register 30 may cooperate to ascertain whether the new sequence is appropriate for storage in register 30 and statistical treatment by accumulator 34. A new sequence may be appropriate for storage in register 30 and statistical treatment by accumulator 34 when a new sequence is different from sequences stored in register 30 and is better (as measured by the predetermined evaluating algorithm) than sequences stored in register 30.

Register 30 may store all appropriate sequences, but accumulator 34 may be limited to treating a predetermined number of best sequences. Thus, register 30 may cooperate with accumulator 34 and adder 32 to add better sequences (i.e., sequences evaluated as better than sequences currently treated by accumulator 32) to accumulator 34 for treatment. Once the predetermined number of best sequences is treated by accumulator 34, whenever register 30 seeks to add a new best sequence to accumulator 34 for treatment, register 30 and subtractor 38 may cooperate to remove a "least best" sequence (i.e., a sequence evaluated as not as good as all other sequences currently treated by accumulator 34) from accumulator 34 treatment. That is, sequences may be added to accumulator 34 from register 30 via adder 36 until accumulator 34 is dealing with a predetermined number of sequences. After accumulator 34 may be dealing with the predetermined capacity of sequences, if register 30 adds a sequence to accumulator 34 for treatment, a sequence may be withdrawn from accumulator 34 using subtractor 38.

Selector 46 may provide the new sequence to regulating unit 20 (regardless of whether it is deemed appropriate for storing and effecting statistical treatment by tracking unit 14). It may be preferred that an indication of quality of the new sequence accompany the new sequence to regulating unit 20 so that regulating unit 20 may identify and store at least a best-sequence-yet-received. Regulating unit 20 may employ at least one predetermined criterion to either: (1) order generator 40 to generate another initial new sequence, or (2) present the best-sequence-yet-received to output locus 22, thus terminating the optimization operation.

If generator 40 is ordered to generate another initial new sequence, system 10 may continue the optimization operation using improver 42, evaluator 44, selector 46, tracking unit 14 and regulating unit 20 as described until occurrence of at least one predetermined criterion. The predetermined criterion may be embodied in, by way of example and not by way of limitation, a predetermined number of new sequences being evaluated by evaluator 44 or may be one or more other criteria.

FIG. 2 is a schematic diagram of a representation of a first exemplary sequence stored according to the teachings of the present disclosure. In FIG. 2, a grid or table 50 is arranged with elements of a sequence, such as numerals 0, 1, 2, 3, 4, 5, 6, 7, 8, 9, may be arrayed in columns 52 and in rows 54. Individual cells may be identified by a (row, column) designation so that, for example, a cell 56 in row 9, column 5 may be identified as cell (9, 5) or cell [9][5]. Grid 50 may represent a statistical record of all occurrences of one item before another item in sequences which accumulator 34 (FIG. 1) may currently treat. As each sequence is created (e.g., by generator 40; FIG. 1) and processed for storing in register 30 and treatment by accumulator 34, accumulator 34 may present in grid 50 a count in each cell (i,j) of how many times an item [i] may appear preceding an item [j] among the sequences currently treated by accumulator 34.

Data reflected in grid 50 may be managed by adder 36, subtractor 38, and accumulator 34. If a sequence may be added to accumulator 34 then "1" may be added for each instance of an element preceding another. If a sequence may be subtracted or removed from accumulator 34 then "1" may be subtracted for each instance of an element preceding another. That is, "1's" that may have been added to accumulator 34 when the sequence was recorded may be subtracted from accumulator 34 when the sequence may be removed or subtracted. Register 30, adder, 36 and subtractor 38 may cooperate so that there may be no circumstance in which a sequence may be subtracted without first having been added in some prior step or iteration. Accumulator 34 may only contain zero or positive numbers.

By way of simplistic example and not by way of limitation, when grid 50 may be populated using the above routine given the Sequence #1 of the following four sequences Sequence #1: 1, 3, 5, 7, 6, 4, 2, 8, 0, 9
Sequence #2: 0, 1, 7, 9, 8, 3, 4, 5, 6, 2
Sequence #3: 2, 1, 7, 8, 9, 6, 5, 4, 3, 0
Sequence #4: 8, 4, 5, 2, 6, 9, 0, 1, 7, 3 grid 50 may appear as illustrated in FIG. 2.

To illustrate, in Sequence #1 (1, 3, 5, 7, 6, 4, 2, 8, 0, 9):

"1" precedes 3, 5, 7, 6, 4, 2, 8, 0 and 9. Therefore, "1" may be added to each of cell (1, 3), (1, 5), (1, 7), (1, 6), (1, 4), (1, 2), (1, 8), (1, 0) and (1, 9).

"3" precedes 5, 7, 6, 4, 2, 8, 0 and 9. Therefore, "1" may be added to each of cell (3, 5), (3, 7), (3, 6), (3, 4), (3, 2), (3, 8), (3, 0) and (3, 9).

"5" precedes 7, 6, 4, 2, 8, 0 and 9. Therefore, "1" may be added to each of cell (5, 7), (5, 6), (5, 4), (5, 2), (5, 8), (5, 0) and (5, 9).

"7" precedes 6, 4, 2, 8, 0 and 9. Therefore, "1" may be added to each of cell (7, 6), (7, 4), (7, 2), (7, 8), (7, 0) and (7, 9).

"6" precedes 4, 2, 8, 0 and 9. Therefore, "1" may be added to each of cell (6, 4), (6, 2), (6, 8), (6, 0) and (6, 9).

"4" precedes 2, 8, 0 and 9. Therefore, "1" may be added to each of cell (4, 2), (4, 8), (4, 0) and (4, 9).

"2" precedes 8, 0 and 9. Therefore, "1" may be added to each of cell (2, 8), (2, 0) and (2, 9).

"8" precedes 0 and 9. Therefore, "1" may be added to each of cell (8, 0) and (8, 9).

"0" precedes 9. Therefore, "1" may be entered in cell (0, 9).

"9" precedes nothing, so no entry may be made in the row of grid 50 associated with "9".

If accumulator 34 may not have reached a predefined capacity, then the representation of Sequence #1 illustrated in FIG. 2 may be added to accumulator 34, preferably in a matrix format substantially similar with grid 50. If accumulator 34 has reached its predefined capacity, the representation of Sequence #1 illustrated in FIG. 2 may be added to accumulator 34 and, as an additional step, the worst sequence represented by entries in into accumulator 34 (as measured by a predetermined criterion) may be removed or subtracted from accumulator 34. The process of subtraction may be described further in connection with FIG. 9.

FIG. 3 is a schematic diagram of a representation of a second exemplary sequence stored according to the teachings of the present disclosure. In FIG. 3, when a grid 60 may be populated using the above routine given the Sequence #2 of the following four sequences Sequence #1: 1, 3, 5, 7, 6, 4, 2, 8, 0, 9
Sequence #2: 0, 1, 7, 9, 8, 3, 4, 5, 6, 2
Sequence #3: 2, 1, 7, 8, 9, 6, 5, 4, 3, 0
Sequence #4: 8, 4, 5, 2, 6, 9, 0, 1, 7, 3 grid 60 may appear as illustrated in FIG. 3.

To illustrate, in Sequence #2 (0, 1, 7, 9, 8, 3, 4, 5, 6, 2):

"0" precedes 1, 7, 9, 8, 3, 4, 5, 6 and 2. Therefore, "1" may be entered in cells (0, 1), (0, 7), (0, 9), (0, 8), (0, 3), (0, 4), (0, 5), (0, 6) and (0, 2).

"1" precedes 7, 9, 8, 3, 4, 5, 6 and 2. Therefore, "1" may be added to each of cell (1, 7), (1, 9), (1, 8), (1, 3), (1, 4), (1, 5), (1, 6) and (1, 2).

"7" precedes 9, 8, 3, 4, 5, 6 and 2. Therefore, "1" may be added to each of cell (7, 9), (7, 8), (7, 3), (7, 4), (7, 5), (7, 6) and (7, 2).

"9" precedes 8, 3, 4, 5, 6 and 2. Therefore, "1" may be added to each of cell (9, 8), (9, 3), (9, 4), (9, 5), (9, 6) and (9, 2).

"8" precedes 3, 4, 5, 6 and 2. Therefore, "1" may be added to each of cell (8, 3), (8, 4), (8, 5), (8, 6) and (8, 2).

"3" precedes 4, 5, 6 and 2. Therefore, "1" may be added to each of cell (3, 4), (3, 5), (3, 6) and (3, 2).

"4" precedes 5, 6 and 2. Therefore, "1" may be added to each of cell (4, 5), (4, 6) and (4, 2).

"5" precedes 6 and 2. Therefore, "1" may be added to each of cell (5, 6) and (5, 2).

"6" precedes 2. Therefore, "1" may be added to cell (6, 2).

"2" precedes nothing, so no entry may be made in the row of grid 60 associated with "2".

If accumulator 34 may not have reached a predefined capacity, then the representation of Sequence #2 illustrated in FIG. 3 may be added to accumulator 34, preferably in a matrix format substantially similar with grid 60 (see FIG. 6). If accumulator 34 has reached its predefined capacity, the representation of Sequence #2 illustrated in FIG. 3 may be added to accumulator 34 and, as an additional step, the worst sequence represented by entries in into accumulator 34 (as measured by a predetermined criterion) may be removed or subtracted from accumulator 34. The process of subtraction may be described further in connection with FIG. 9.

FIG. 4 is a schematic diagram of a representation of a third exemplary sequence stored according to the teachings of the present disclosure. In FIG. 4, when a grid 62 may be populated using the above routine given the Sequence #3 of the following four sequences Sequence #1: 1, 3, 5, 7, 6, 4, 2, 8, 0, 9
Sequence #2: 0, 1, 7, 9, 8, 3, 4, 5, 6, 2
Sequence #3: 2, 1, 7, 8, 9, 6, 5, 4, 3, 0
Sequence #4: 8, 4, 5, 2, 6, 9, 0, 1, 7, 3 grid 62 may appear as illustrated in FIG. 4.

To illustrate, in Sequence #3 (2, 1, 7, 8, 9, 6, 5, 4, 3, 0):

"2" precedes 1, 7, 8, 9, 6, 5, 4, 3 and 0. Therefore, "1" may be entered in cells (2, 1), (2, 7), (2, 8), (2, 9), (2, 6), (2, 5), (2, 4), (2, 3) and (2, 0).

"1" precedes 7, 8, 9, 6, 5, 4, 3 and 0. Therefore, "1" may be added to each of cell (1, 7), (1, 8), (1, 9), (1, 6), (1, 5), (1, 4), (1, 3) and (1, 0).

"7" precedes 8, 9, 6, 5, 4, 3 and 0. Therefore, "1" may be added to each of cell (7, 8), (7, 9), (7, 6), (7, 5), (7, 4), (7, 3) and (7, 0).

"8" precedes 9, 6, 5, 4, 3 and 0. Therefore, "1" may be added to each of cell (8, 9), (8, 6), (8, 5), (8, 4), (8, 3) and (8, 0).

"9" precedes 6, 5, 4, 3 and 0. Therefore, "1" may be added to each of cell (9, 6), (9, 5), (9, 4), (9, 3) and (9, 0).

"6" precedes 5, 4, 3 and 0. Therefore, "1" may be added to each of cell (6, 5), (6, 4), (6, 3) and (6, 0).

"5" precedes 4, 3 and 0. Therefore, "1" may be added to each of cell (5, 4), (5, 3) and (5, 0).

"4" precedes 3 and 0. Therefore, "1" may be added to each of cell (4, 3) and (4, 0).

"3" precedes 0. Therefore, "1" may be added to cell (3, 0).

"0" precedes nothing, so no entry may be made in the row of grid 62 associated with "0".

If accumulator 34 may not have reached a predefined capacity, then the representation of Sequence #3 illustrated in FIG. 4 may be added to accumulator 34, preferably in a matrix format substantially similar with grid 62 (see FIG. 6). If accumulator 34 has reached its predefined capacity, the representation of Sequence #3 illustrated in FIG. 4 may be added to accumulator 34 and, as an additional step, the worst sequence represented by entries in into accumulator 34 (as measured by a predetermined criterion) may be removed or subtracted from accumulator 34. The process of subtraction may be described further in connection with FIG. 9.

FIG. 5 is a schematic diagram of a representation of a fourth exemplary sequence stored according to the teachings of the present disclosure. In FIG. 5, when a grid 64 may be populated using the above routine given the Sequence #4 of the following four sequences Sequence #1: 1, 3, 5, 7, 6, 4, 2, 8, 0, 9
Sequence #2: 0, 1, 7, 9, 8, 3, 4, 5, 6, 2
Sequence #3: 2, 1, 7, 8, 9, 6, 5, 4, 3, 0
Sequence #4: 8, 4, 5, 2, 6, 9, 0, 1, 7, 3 grid 64 may appear as illustrated in FIG. 5.

To illustrate, in Sequence #4 (8, 4, 5, 2, 6, 9, 0, 1, 7, 3):

"8" precedes 4, 5, 2, 6, 9, 0, 1, 7 and 3. Therefore, "1" may be entered in cells (8, 4), (8, 5), (8, 2), (8, 6), (8, 9), (8, 0), (8, 1), (8, 7) and (8, 3).

"4" precedes 5, 2, 6, 9, 0, 1, 7 and 3. Therefore, "1" may be added to each of cell (4, 5), (4, 2), (4, 6), (4, 9), (4, 0), (4, 1), (4, 7) and (4, 3).

"5" precedes 2, 6, 9, 0, 1, 7 and 3. Therefore, "1" may be added to each of cell (5, 2), (5, 6), (5, 9), (5, 0), (5, 1), (5, 7) and (5, 3).

"2" precedes 6, 9, 0, 1, 7 and 3. Therefore, "1" may be added to each of cell (2, 6), (2, 9), (2, 0), (2, 1), (2, 7) and (2, 3).

"6" precedes 9, 0, 1, 7 and 3. Therefore, "1" may be added to each of cell (6, 9), (6, 0), (6, 1), (6, 7) and (6, 3).

"9" precedes 0, 1, 7 and 3. Therefore, "1" may be added to each of cell (9, 0), (9, 1), (9, 7) and (9, 3).

"0" precedes 1, 7 and 3. Therefore, "1" may be added to each of cell (0, 1), (0, 7) and (0, 3).

"1" precedes 7 and 3. Therefore, "1" may be added to each of cell (1, 7) and (1, 3).

"7" precedes 3. Therefore, "1" may be added to cell (7, 3).

"3" precedes nothing, so no entry may be made in the row of grid 64 associated with "3".

If accumulator 34 may not have reached a predefined capacity, then the representation of Sequence #4 illustrated in FIG. 5 may be added to accumulator 34, preferably in a matrix format substantially similar with grid 64 (see FIG. 6). If accumulator 34 has reached its predefined capacity, the representation of Sequence #4 illustrated in FIG. 5 may be added to accumulator 34 and, as an additional step, the worst sequence represented by entries in into accumulator 34 (as measured by a predetermined criterion) may be removed or subtracted from accumulator 34. The process of subtraction may be described further in connection with FIG. 9.

FIG. 6 is a schematic diagram of a representation of data stored in the accumulator of the present disclosure after adding representations illustrated in FIGS. 2 and 3. In FIG. 6, a cell-by-cell addition of cells in FIGS. 2 and 3 (i.e., Sequences #1 and #2) may yield the cell-by-cell sum-array or grid 66 illustrated in FIG. 6. Entries in cells of grid 66 may indicate a number of occurrences of a particular numeral appearing before another particular number in Sequences #1 and #2.

Thus, by way of example, cell (6,2) contains a "2" entry, indicating that the number 6 may appear before the number 2 in both of Sequences #1 and #2. Cell (2,5) contains a "0" entry, indicating that the number 2 may not appear before the number 5 in both of Sequences #1 and #2. Cell (5,0) contains a "1" entry, indicating that the number 5 may appear before the number 0 in one of Sequences #1 and #2. The annotation scheme may be understood by one skilled in the art of statistical evaluations. In order to avoid prolixity a detailed description of each respective cell (i, j) will not be provided here.

FIG. 7 is a schematic diagram of a representation of data stored in the accumulator of the present disclosure after adding representations illustrated in FIGS. 4 and 6. In FIG. 7, a cell-by-cell addition of cells in FIGS. 2, 3 and 4 (i.e., Sequences #1, #2 and #3) may yield the cell-by-cell sum-array or grid 68 illustrated in FIG. 7. Entries in cells of grid 68 may indicate a number of occurrences of a particular numeral appearing before another particular number in Sequences #1, #2 and #3.

Thus, by way of example, cell (6,2) contains a "2" entry, indicating that the number 6 may appear before the number 2 in two of the Sequences #1, #2 and #3. Cell (2,5) contains a "1" entry, indicating that the number 2 may appear before the number 5 in one of Sequences #1, #2 and #3. Cell (5,0) contains a "2" entry, indicating that the number 5 may appear before the number 0 in two of Sequences #1, #2 and #3. The annotation scheme may be understood by one skilled in the art of statistical evaluations. In order to avoid prolixity a detailed description of each respective cell (i, j) will not be provided here.

In the cell-by-cell sum-array or grid 68 presented in FIG. 7, numerals contained in respective cells (i,j) may indicate the number of occurrences of ordering relationships experienced among the sequences represented in the array. In FIG. 7, cells (i,j) containing a "0" may show ordering relationships that did not occur in Sequences #1, #2 and #3. Cells (i,j) containing a "1" may show ordering relationships that occurred only one time in Sequences #1, #2 and #3. Cells (i,j) containing a "2" may show ordering relationships that occurred only two times in Sequences #1, #2 and #3. Cells (i,j) containing a "3" may show ordering relationships that occurred three times in Sequences #1, #2 and #3.

In FIG. 7, the sum of "opposite" cells—that is, the sum of cell (i,j) and cell (j,i)—equals n, where n equals the number of sequences that have been employed to construct the cell-by-cell sum-array or grid 50. In the case of FIG. 7, n=3. This symmetry between opposite cells may permit desired results from statistically weighted sorts described in connection with FIGS. 11-13.

FIG. 8 is a schematic diagram of a representation of data stored in the accumulator of the present disclosure after adding representations illustrated in FIGS. 5 and 7. In FIG. 8, a cell-by-cell addition of cells in FIGS. 2, 3, 4 and 5 (i.e., Sequences #1, #2, #3 and #4) may yield the cell-by-cell sum-array or grid 70 illustrated in FIG. 8. Entries in cells of grid 70 may indicate a number of occurrences of a particular numeral appearing before another particular number in Sequences #1, #2, #3 and #4.

Thus, by way of example, cell (6,2) contains a "2" entry, indicating that the number 6 may appear before the number 2 in two of the Sequences #1, #2, #3 and #4. Cell (2,5) contains a "1" entry, indicating that the number 2 may appear before the number 5 in one of Sequences #1, #2, #3 and #4. Cell (5,0) contains a "3" entry, indicating that the number 5 may appear before the number 0 in three of Sequences #1, #2, #3 and #4. The annotation scheme may be understood by one skilled in the art of statistical evaluations. In order to avoid prolixity a detailed description of each respective cell (i, j) will not be provided here.

FIG. 9 is a schematic diagram of a representation of data stored in the accumulator of the present disclosure after subtracting the representation illustrated in FIG. 3 from the representation illustrated in FIG. 8. By way of example and not by way of limitation, let it be assumed that according to a predetermined criterion Sequence #2 is of lesser value than Sequences #1, #3 and #4. Let it be further assumed, for purposes of illustration, that the capacity of accumulator 34 (FIG. 1) is three sequences. A result of such a situation may be to require subtracting the least desirable sequence (i.e., Sequence #2) from the cell-by-cell sum-array or grid 70 illustrated in FIG. 8. The result of such a subtraction may be viewed in FIG. 9.

In FIG. 9, the "1" entries associated with Sequence #2 (presented in FIG. 3) have been subtracted from the array illustrated in FIG. 8 in a cell-by-cell fashion to present a cell-by-cell sum-array or grid 72 representing cell-by-cell addition of cells in FIGS. 2, 3, 4 and 5, less cell entries presented in FIG. 3 (i.e., Sequences #1, #3 and #4).

Register 30, adder 36 and subtractor 38 (FIG. 1) may cooperate to assure a sequence may not be subtracted without having been added in a prior step. Accumulator 34 may preferably contain only zeros or positive numbers.

FIG. 10 is a schematic diagram of a representation of data stored in the accumulator of the present disclosure as illustrated in FIG. 8, with row and column sums presented. In FIG. 10, sums of entries in each row and in each column of the cell-by-cell sum-array or grid 70 presented in FIG. 8 are presented adjacent to respective rows and columns in a grid 74. The row sums and column sums may be useful in carrying out statistical probability calculations described in connection with FIGS. 11-13.

Accumulator 34 (FIG. 1) may employ grid 74 to effect statistical treatment of sequences. Generator 40 (FIG. 1) may cooperate with accumulator 34 using grid 74 to create an initial new sequence that is statistically similar to sequences treated by accumulator 34. By way of example and not by way of limitation, Generator 40 may perform a statistical analysis by beginning with a random sequence. The random sequence may then modified by a series of three steps that perform a column-based sort, a row-based sort, and a cell-based sort to produce a final generated sequence.

Accumulator 34 and generator 40 may cooperate to extract statistics from columns of grid 74 to create a new sequence that may roughly measure the number of successors for each item in a solution sequence.

The initial random sequence may then be sorted into reverse order, using the successor data from the column-extraction to weight probability of exchanging two items. Probability of exchanging two items [i] and [j] may be expressed as:

$$P[Exch[i]\&[j]]\sim\{\Sigma col[j]\}\div\{\Sigma col[i]+\Sigma col[j]\} \qquad [1]$$

That is, the probability of exchanging item [i] with item [j] may be proportional to the sum of elements in column [j] divided by a quantity which is the sum of elements in a column containing element [i] plus the sum of elements in a column containing element [j] This operation may be referred to as a column-based sort.

FIG. 11 is a schematic diagram of a representation of column probabilities associated with data presented in FIG. 10. In FIG. 11, a column-based sort may be carried out as described below. FIG. 11 may be regarded as a column-column array or grid 76. That is "columns" in FIG. 11 and "rows" in FIG. 11 each represent columns in expression [1]. Said another way, the column sum for column [i] may be read at the end of a horizontal "row" in FIG. 11, and the column sum for a column [j] may be read at the bottom of a vertical "column" in FIG. 11.

By way of example and not by way of limitation, to evaluate probability of exchanging a "3" with a "5" in the sequences represented in FIG. 10, one may employ expression [1] as follows:

$$P[Exch[i]\&[j]]\sim\{\Sigma col[j]\}\div\{\Sigma col[i]+\Sigma col[j]\} \qquad [1]$$

$$P[Exch[3]\&[5]]\sim\{\Sigma col[5]\}\div\{\Sigma col[3]+\Sigma col[5]\}$$

$$P[Exch[3]\&[5]]\sim\{10\}\div\{18+10\}$$

$$P[Exch[3]\&[5]]\sim\{10\}\div\{28\}$$

$$P[Exch[3]\&[5]]\sim 0.4$$

This result may be found in grid 76 at the matrix location (3, 5).

The annotation scheme of FIG. 11 may be understood by one skilled in the art of statistical evaluations. In order to avoid prolixity a detailed description of each respective column-based sort represented in FIG. 11 will not be provided here.

Using column [j] as the numerator and using (column [i]+column [j]) as the denominator in expression [1] may have the effect of sorting items in the random sequence into approximately the same order as the columns if sorted into descending order by their respective column sums.

Statistics may be extracted from rows of grid 76 that may roughly measure the number of predecessors for each item in a solution sequence. The sorted sequence of the column-based sort may be sorted into order, using the predecessor data from the column-extraction above to weigh probability of exchanging two items. Probability of exchanging two items [i] and [j] may be expressed as:

$$P[Exch[i]\&[j]]\sim\{\Sigma row[i]\}\div\{\Sigma row[i]+\Sigma row[j]\} \qquad [2]$$

That is, the probability of exchanging item [i] with item [j] may be proportional to the sum of elements in row [i] divided by a quantity which is the sum of elements in a row containing element [i] plus the sum of elements in a row containing element [j]. This operation may be referred to as a row-based sort.

FIG. 12 is a schematic diagram of a representation of row probabilities associated with data presented in FIG. 10. In FIG. 12, a row-based sort may be carried out as described below. FIG. 12 may be regarded as a row-row array or grid 78. That is "columns" in FIG. 12 and "rows" in FIG. 12 each represent rows in expression [2]. Said another way, the row sum for row [i] may be read at the end of a horizontal "row" in FIG. 12, and the row sum for a row [j] may be read at the bottom of a vertical "column" in FIG. 12.

By way of example and not by way of limitation, to evaluate probability of exchanging a "3" with a "5" in the sequences represented in FIG. 10, one may employ expression [2] as follows:

$$P[Exch[i]\&[j]]\sim\{\Sigma row[i]\}\div\{\Sigma row[i]+\Sigma row[j]\} \qquad [2]$$

$$P[Exch[3]\&[5]]\sim\{\Sigma row[3]\}\div\{\Sigma row[3]+\Sigma row[5]\}$$

$$P[Exch[3]\&[5]]\sim\{9\}\div\{9+17\}$$

$$P[Exch[3]\&[5]]\sim\{9\}\div\{26\}$$

$$P[Exch[3]\&[5]]\sim 0.4$$

This result may be found in grid 78 at the matrix location (3, 5).

The annotation scheme of FIG. 12 may be understood by one skilled in the art of statistical evaluations. In order to avoid prolixity a detailed description of each respective column-based sort represented in FIG. 12 will not be provided here.

Using row [i] as the numerator and using (row [i]+row [j]) as the denominator in expression [2] may have the effect of sorting items in the random sequence into approximately the same order as the rows if sorted into ascending order by their respective row sums.

The row-based sort may be refined using contents of individual cells of grid 78 to weight probability of exchanging two items. Probability of exchanging two items [i] and [j] may be expressed as:

$$P[Exch[i]\&[j]] \sim \{\Sigma cell[i][j]\} \div \{\Sigma cell[i][j] + \Sigma cell[j][i]\}$$

That is, the probability of exchanging item [i] with item [j] may be proportional to the element in cell [i][j] divided by a quantity which is the sum of elements in cell [i][j] (i.e., a cell located by a row containing element [i] and a column containing element [j]) plus the sum of elements in cell [j][i] (i.e., a cell located by a row containing element [j] and a column containing element [i]). This operation may be referred to as a cell-based sort.

The result of the cell-based sort may be presented by generator 40 (FIG. 1) as a new sequence.

FIG. 13 is a schematic diagram of a representation of cell probabilities associated with data presented in FIG. 10. In FIG. 13, a cell-based sort may be carried out as described below. By way of example and not by way of limitation, to evaluate probability of exchanging a "3" with a "5" in the sequences represented in FIG. 10, one may employ expression [3] as follows:

$$P[Exch[i]\&[j]) \sim \{\Sigma cell[i][j]\} \div \{\Sigma cell[i][j] + \Sigma cell[j][i]\} \quad [3]$$

$$P[Exch[3]\&[5]) \sim \{\Sigma cell[3][5]\} \div \{\Sigma cell[3][5] + \Sigma cell[5][3]\}$$

$$P[Exch[3]\&[5]) \sim \{1\} \div \{1+2\}$$

$$P[Exch[3]\&[5]) \sim \{1\} \div \{3\}$$

$$P[Exch[3]\&[5]) \sim 0.3$$

This result may be found in a grid 80 illustrated in FIG. 12 at the matrix location (3, 5).

The annotation scheme of FIG. 12 may be understood by one skilled in the art of statistical evaluations. In order to avoid prolixity a detailed description of each respective column-based sort represented in FIG. 12 will not be provided here.

Using cell[i][j] as the numerator and using (cell[i][j]+cell[j][i]) as the denominator in expression [3] may have the effect of sorting items in the random sequence into approximately an order in which the probability of an item [i] occurring before an item [j] may be determined by the statistical data contained within accumulator 34 (FIG. 1).

The result of this cell-based sort may be an output from generator 40 (FIG. 1). The combination of steps described above may be important. Simple, deterministic sorts may not yield the careful balance between similarity and difference. In practice, a single sort (e.g., sorting by successors, by predecessors or by comparative weighting) may not fully reflect statistical characteristics of sequences represented in accumulator 34.

Figure 14:
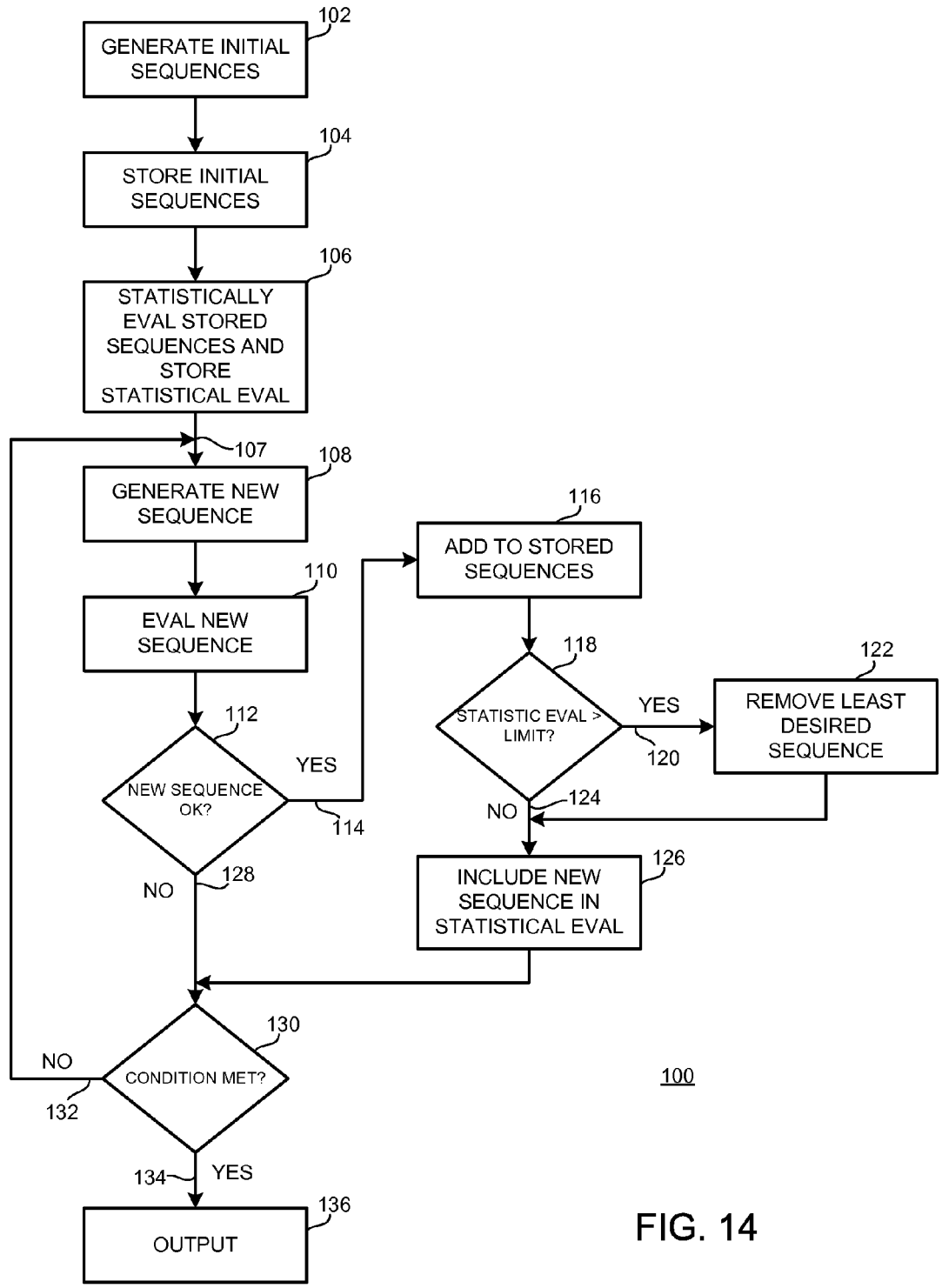
FIG. 14 is a flow diagram illustrating a method for optimizing a sequential arrangement of items.

FIG. 14 is a flow diagram illustrating a method for optimizing a sequential arrangement of items. In FIG. 14, a method 100 for optimizing a sequence of items according to an algorithm may begin with generating a predetermined number of initial sequences, as indicated by a block 102.

Method 100 may continue with storing the initial sequences in a data store to establish a set of stored sequences, as indicated by a block 104.

Method 100 may continue with statistically evaluating the stored sequences and storing statistical evaluation of the stored sequences, as indicated by a block 106.

Method 100 may continue with employing the statistical evaluation to generate a new sequence, as indicated by a block 108.

Method 100 may continue with evaluating the new sequence with respect to the stored sequences according to the algorithm, as indicated by a block 110.

Method 100 may continue with posing a query whether the new sequence is acceptable, as indicated by a query block 112. If the new sequence is acceptable, method 100 may proceed from query block 112 via a YES response line 114 to add the new sequence to the stored sequences, as indicated by a block 116.

Method 100 may continue with posing a query whether the number of statistically evaluated sequences has reached a predetermined number, as indicated by a query block 118. If the number of statistically evaluated sequences has reached the predetermined number, method 100 may proceed from query block 118 via a YES response line 120 to remove the least desired sequence from statistical evaluation, as indicated by a block 122.

If the number of statistically evaluated sequences has not reached the predetermined number, method 100 may proceed from query block 118 via a NO response line 124.

Method 100 may continue with including the new, acceptable, sequence to the statistically evaluated sequences, as indicated by a block 126. Method 100 may continue with posing a query whether at least one predetermined condition has been met, as indicated by a query block 130.

If the new sequence is not acceptable, method 100 may proceed from query block 112 via a NO response line 128 to pose the query indicated by query block 130.

If the at least one predetermined condition has not been met, method 100 may continue from query block 130 via a NO response line 132 and method 100 may proceed to a locus 107. Method 100 may proceed from locus 107 substantially as described above in connection with blocks 108, 110, 112, 116, 118, 122, 126, 130.

If the at least one predetermined condition has been met, method 100 may continue from query block 130 via a YES response line 134 to present the best-sequence-yet-received at an output locus 136.

It is to be understood that, while the detailed drawings and specific examples given describe preferred embodiments of the disclosure, they are for the purpose of illustration only, that the system and method of the disclosure are not limited to the precise details and conditions disclosed and that various changes may be made therein without departing from the spirit of the disclosure which is defined by the following claims:

We claim:

1. A system for effecting optimization of a sequential arrangement of items with respect to a predetermined evaluating algorithm; the system comprising:
   a computer processor; and
   a computer-readable storage device having encoded thereon computer-readable instructions that are executable by the computer processor to perform functions that provide:
   (a) an initiating unit;
   (b) a tracking unit coupled with said initiating unit;
   (c) a generating unit coupled with said tracking unit;
   (d) a measuring unit coupled with said generating unit and with said tracking unit;
   (e) a regulating unit coupled with said measuring unit and said generating unit; and
   (f) an output locus coupled with said regulating unit;

said initiating unit providing a predetermined number of initial sequences to said tracking unit; said tracking unit including a register for storing said initial sequences and an accumulator for effecting a statistical treatment of said initial sequences; said register and said accumulator each coupled to an adjusting unit; said register, said accumulator and said adjusting unit cooperating to ensure said statistical treatment relates to no more than a predetermined number of best sequences based on said predetermined evaluating algorithm; said generating unit employing said statistical treatment to present a new sequence; said measuring unit evaluating said new sequence according to said predetermined evaluating algorithm; said measuring unit cooperating with said tracking unit to effect providing said new sequence to said tracking unit when said evaluating indicates said new sequence is appropriate for said storing and statistical treatment; said measuring unit providing said new sequence to said regulating unit with an indication of efficacy of said new sequence; said regulating unit employing said indication to store at least a best-sequence-yet-received; said regulating unit responding to at least one predetermined criterion to order said generating unit to present a new sequence or to present said best-sequence-yet-received at said output locus.

2. The system for effecting optimization of a sequential arrangement of items with respect to a predetermined evaluating algorithm as recited in claim 1 wherein the functions performed by the computer processor further provide said generating unit including a generator element and an improver element coupled with said generator element; said generator element employing said statistical treatment to present an initial new sequence to said improver element; said improver element treating said initial new sequence to present said new sequence.

3. The system for effecting optimization of a sequential arrangement of items with respect to a predetermined evaluating algorithm as recited in claim 1 wherein the functions performed by the process further provide said measuring unit including an evaluator element and a selector element coupled with said evaluator element; said evaluator element effecting said evaluating said new sequence; said selector element controlling said providing said new sequence to said tracking unit and effecting said providing said new sequence to said regulating unit.

4. The system for effecting optimization of a sequential arrangement of items with respect to a predetermined evaluating algorithm as recited in claim 1 wherein the functions performed by the computer processor further provide said generating unit including a generator element and an improver element coupled with said generator element; said generator element employing said statistical treatment to present an initial new sequence to said improver element; said improver element treating said initial new sequence to present said new sequence.

5. The system for effecting optimization of a sequential arrangement of items with respect to a predetermined evaluating algorithm as recited in claim 4 wherein the functions performed by the computer processor further provide said measuring unit including an evaluator element and a selector element coupled with said evaluator element; said evaluator element effecting said evaluating said new sequence; said selector element controlling said providing said new sequence to said tracking unit and effecting said providing said new sequence to said regulating unit.

6. The system for effecting optimization of a sequential arrangement of items with respect to a predetermined evaluating algorithm as recited in claim 5 wherein said evaluating indicates said new sequence is appropriate for said storing and statistical treatment when said new sequence is different than sequences previously stored in said tracking unit and said new sequence is better than sequences previously stored in said tracking unit according to said predetermined evaluating algorithm.

7. A method for effecting optimization of a sequential arrangement of items with respect to a predetermined evaluating algorithm; the method comprising:
(a) in no particular order:
(1) providing an initiating unit;
(2) providing a tracking unit configured for coupling with said initiating unit;
(3) providing a generating unit configured for coupling with said tracking unit;
(4) providing a measuring unit configured for coupling with said generating unit and with said tracking unit;
(5) providing a regulating unit configured for coupling with said measuring unit and said generating unit; and
(6) providing an output locus configured for coupling with said regulating unit;
(b) operating said initiating unit to provide a predetermined number of initial sequences to said tracking unit;
(c) operating said tracking unit to store and effect a statistical treatment of said initial sequences, wherein said tracking unit includes a register for storing said initial sequences and an accumulator for effecting said statistical treatment; said register and said accumulator each coupled to an adjusting unit; said register, said accumulator and said adjusting unit cooperating to ensure said statistical treatment relates to no more than a predetermined number of best sequences based on said predetermined evaluating algorithm;
(d) operating said generating unit to employ said statistical treatment to present a new sequence;
(e) operating said measuring unit to evaluate said new sequence according to said predetermined evaluating algorithm;
(f) in no particular order:
(1) operating said measuring unit to cooperate with said tracking unit to effect providing said new sequence to said tracking unit when said evaluating indicates said new sequence is appropriate for said storing and statistical treatment; and
(2) operating said measuring unit to provide said new sequence to said regulating unit with an indication of efficacy of said new sequence;
(g) operating said regulating unit to employ said indication to store at least a best sequence-yet-received; and
(h) operating said regulating unit to respond to at least one predetermined criterion to order said generating unit to present a new sequence or to present said best-sequence-yet-received at said output locus.

8. The method for effecting optimization of a sequential arrangement of items with respect to a predetermined evaluating algorithm as recited in claim 7 wherein said generating unit includes a generator element and an improver element coupled with said generator element; said generator element employing said statistical treatment to present an initial new sequence to said improver element; said improver element treating said initial new sequence to present said new sequence.

9. The method for effecting optimization of a sequential arrangement of items with respect to a predetermined evaluating algorithm as recited in claim 7 wherein said measuring unit includes an evaluator element and a selector element coupled with said evaluator element; said evaluator element effecting said evaluating said new sequence; said selector element controlling said providing said new sequence to said tracking unit and effecting said providing said new sequence to said regulating unit.

10. The method for effecting optimization of a sequential arrangement of items with respect to a predetermined evaluating algorithm as recited in claim 7 wherein said generating unit includes a generator element and an improver element coupled with said generator element; said generator element employing said statistical treatment to present an initial new sequence to said improver element; said improver element treating said initial new sequence to present said new sequence.

11. The method for effecting optimization of a sequential arrangement of items with respect to a predetermined evaluating algorithm as recited in claim 10 wherein said measuring unit includes an evaluator element and a selector element coupled with said evaluator element; said evaluator element effecting said evaluating said new sequence; said selector element controlling said providing said new sequence to said tracking unit and effecting said providing said new sequence to said regulating unit.

12. The method for effecting optimization of a sequential arrangement of items with respect to a predetermined evaluating algorithm as recited in claim 11 wherein said evaluating indicates said new sequence is appropriate for said storing and statistical treatment when said new sequence is different than sequences previously stored in said tracking unit and said new sequence is better than sequences previously stored in said tracking unit according to said predetermined evaluating algorithm.

13. A system for effecting optimization of a sequential arrangement of items with respect to a predetermined evaluating algorithm; the system comprising:
   a computer processor; and
   a computer-readable storage device having encoded thereon computer-readable instructions that are executable by the computer processor to perform functions that provide:
      (a) an initiating unit;
      (b) a tracking unit coupled with said initiating unit;
      (c) a generating unit coupled with said tracking unit;
      (d) a measuring unit coupled with said generating unit and with said tracking unit;
      (e) a regulating unit coupled with said measuring unit and said generating unit; and
      (f) an output locus coupled with said regulating unit;
   said initiating unit providing a predetermined number of initial sequences to said tracking unit; said tracking unit storing and effecting a statistical treatment of said initial sequences; said generating unit employing said statistical treatment to present a new sequence; said measuring unit evaluating said new sequence according to said predetermined evaluating algorithm; said measuring unit cooperating with said tracking unit to effect providing said new sequence to said tracking unit when said evaluating indicates said new sequence is appropriate for said storing and statistical treatment; said measuring unit providing said new sequence to said regulating unit with an indication of efficacy of said new sequence; said regulating unit employing said indication to store at least a best-sequence-yet-received; said regulating unit responding to at least one predetermined criterion to order said generating unit to present a new sequence or to present said best-sequence-yet-received at said output locus, wherein said evaluating indicates said new sequence is appropriate for said storing and statistical treatment when said new sequence is different than sequences previously stored in said tracking unit and said new sequence is better than sequences previously stored in said tracking unit according to said predetermined evaluating algorithm.

14. A method for effecting optimization of a sequential arrangement of items with respect to a predetermined evaluating algorithm; the method comprising:
   (a) in no particular order:
      (1) providing an initiating unit;
      (2) providing a tracking unit configured for coupling with said initiating unit;
      (3) providing a generating unit configured for coupling with said tracking unit;
      (4) providing a measuring unit configured for coupling with said generating unit and with said tracking unit;
      (5) providing a regulating unit configured for coupling with said measuring unit and said generating unit; and
      (6) providing an output locus configured for coupling with said regulating unit;
   (b) operating said initiating unit to provide a predetermined number of initial sequences to said tracking unit;
   (c) operating said tracking unit to store and effect a statistical treatment of said initial sequences;
   (d) operating said generating unit to employ said statistical treatment to present a new sequence;
   (e) operating said measuring unit to evaluate said new sequence according to said predetermined evaluating algorithm;
   (f) in no particular order:
      (1) operating said measuring unit to cooperate with said tracking unit to effect providing said new sequence to said tracking unit when said evaluating indicates said new sequence is appropriate for said storing and statistical treatment when said new sequence is different than sequences previously stored in said tracking unit and said new sequence is better than sequences previously stored in said tracking unit according to said predetermined evaluating algorithm; and
      (2) operating said measuring unit to provide said new sequence to said regulating unit with an indication of efficacy of said new sequence;
   (g) operating said regulating unit to employ said indication to store at least a best sequence-yet-received; and
   (h) operating said regulating unit to respond to at least one predetermined criterion to order said generating unit to present a new sequence or to present said best-sequence-yet-received at said output locus.

* * * * *